United States Patent [19]

Simpson

[11] Patent Number: 5,050,148
[45] Date of Patent: Sep. 17, 1991

[54] ROTARY COMPACT DISC MAGAZINE HAVING DISC RECEIVING MEANS LIMITED TO A MINOR SEGMENT OF A DISC

[75] Inventor: Mark L. Simpson, Kentwood, Mich.

[73] Assignee: Rowe International, Inc., Whippany, N.J.

[21] Appl. No.: 538,130

[22] Filed: Jun. 14, 1990

[51] Int. Cl.5 ............................................. G11B 17/22
[52] U.S. Cl. .......................................... 369/37; 369/39
[58] Field of Search ......................... 369/34, 35, 36, 37, 369/38, 39, 75.2; 360/92

[56] References Cited

U.S. PATENT DOCUMENTS

| | | | |
|---|---|---|---|
| 2,697,607 | 12/1954 | Vanderzee et al. | 369/36 |
| 2,804,307 | 8/1957 | Rockola | 369/37 |
| 3,690,680 | 9/1972 | Lumney et al. | 369/37 X |
| 4,754,445 | 6/1988 | Young et al. | 369/37 |

Primary Examiner—Stuart S. Levy
Assistant Examiner—Kenneth B. Wells
Attorney, Agent, or Firm—Shenier & O'Connor

[57] ABSTRACT

A compact disc magazine for a jukebox having an automatic mechanism for engaging a compact disc at generally diametrically opposite points and removing the disc from a location adjacent to the top of the magazine through the upper front portion thereof in which a hub mounted for movement around a generally horizontal axis has circumferentially spaced disc-receiving grooves, each of which at the removal location is limited to a segment of a disc below and to the rear of a line passing through said points and a belt extending around the lower part of the magazine for retaining discs in said grooves.

20 Claims, 4 Drawing Sheets

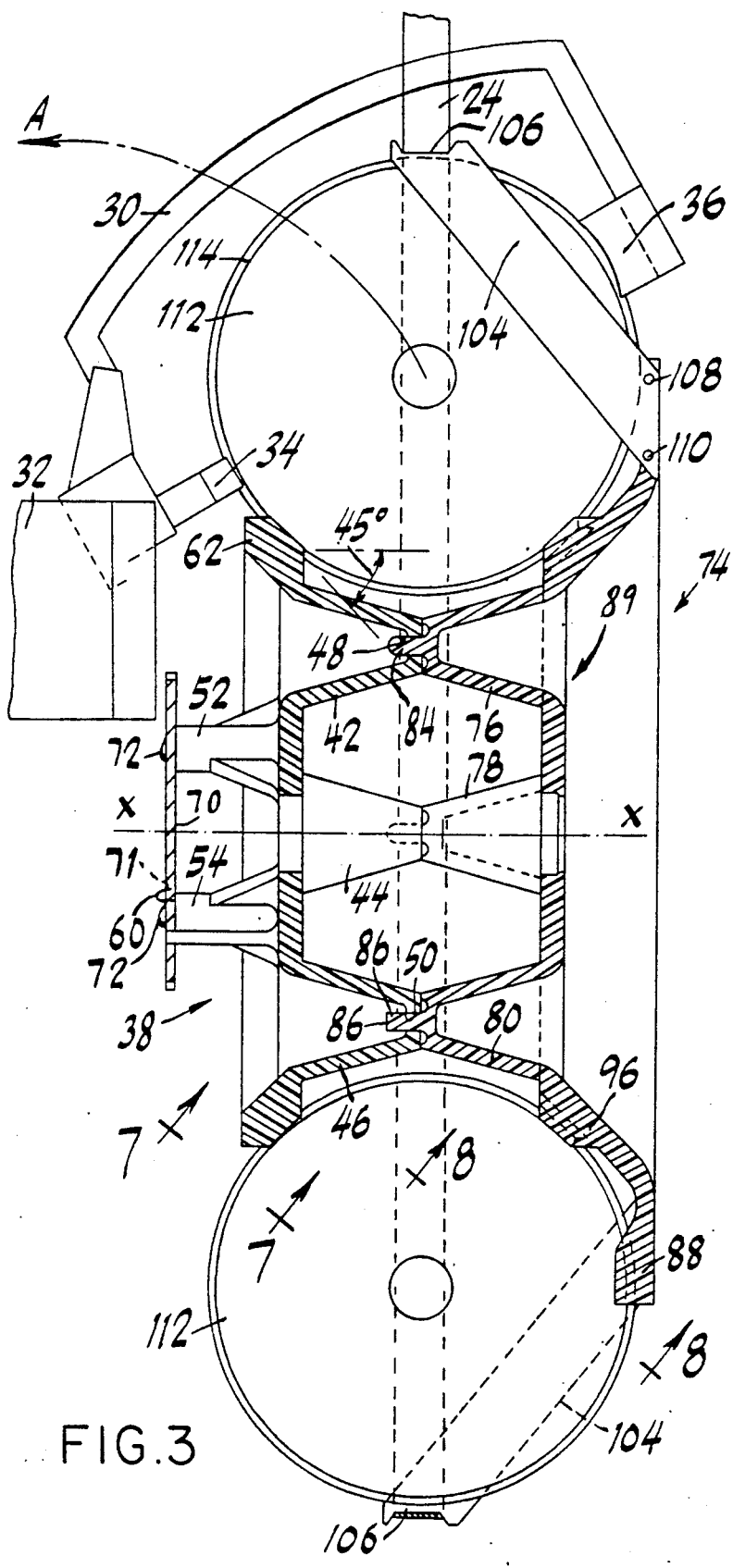
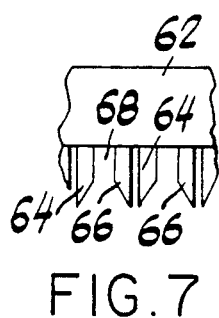
FIG.7
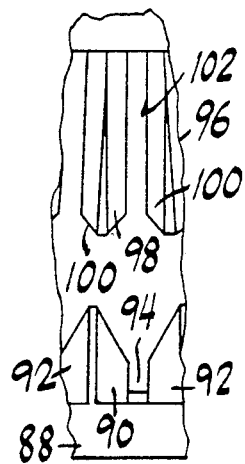
FIG.8
FIG.3

ROTARY COMPACT DISC MAGAZINE HAVING DISC RECEIVING MEANS LIMITED TO A MINOR SEGMENT OF A DISC

FIELD OF THE INVENTION

The invention relates to jukeboxes and, more specifically, to a compact disc magazine for use in a jukebox which plays compact discs.

BACKGROUND OF THE INVENTION

There are known in the prior art jukeboxes which are adapted to play 45 rpm records. Certain of these jukeboxes incorporate a record magazine comprising a hub mounted for movement around a vertical axis and a plurality of radially outwardly extending wire forms, each of which is generally of the shape of an inverted U. The outer ends of the wire forms which would be the basis of the Us, receive a belt which extends over the entire lower portion of the magazine and is directed radially away from the magazine at the top thereof. Records to be played are stored between adjacent wire forms with their edges resting on the hub.

It will readily be appreciated that the belt retains discs in the lower portion of the magazine. In operation of the jukebox, the magazine is rotated until the selected record reaches a position adjacent to the top thereof.

A bow carries a pair of grippers adapted to engage the edge of a record to be played. When a selected record has been positioned adjacent to the top of the magazine, the bow is manipulated to cause its grippers to engage the edge of the selected disc, move the disc out of the top of the magazine, turn the disc on its side and position it on the turntable.

Attempts have been made to adapt the 45 rpm vinyl record magazine of the prior art to handle compact discs. This effort, however, has not proved entirely successful since the discs were scratched in operation of the system by contact with the parts of the magazine and particularly with the belt guides as the disc was withdrawn from between a pair of the wire forms.

SUMMARY OF THE INVENTION

One object of my invention is to provide a compact disc magazine which overcomes the defects of record magazines of the prior art.

Another object of my invention is to provide a magazine which is especially adapted to handle compact discs.

A further object of my invention is to provide a compact disc magazine which is constructed in such a way as to minimize the possibility of damage to the disc.

Still another object of my invention is to provide a compact disc magazine which more closely controls the position of a disc than does the disc magazine of the prior art.

Yet another object of my invention is to provide a compact disc magazine which is less expensive to produce than are magazines of the prior art.

Other and further objects of my invention will appear from the following description.

BRIEF DESCRIPTION OF THE DRAWINGS

In the accompanying drawings to which reference is made in the instant specification and which are to be read in conjunction therewith and in which like parts are indicated by like reference numerals in the various views:

FIG. 3 is a sectional view of my compact disc magazine.

FIG. 7 is a fragmentary view of a portion of my compact disc magazine taken along the line 7—7 of FIG. 3.

FIG. 8 is a fragmentary view of my compact disc magazine taken along the line 8—8 of FIG. 3.

DESCRIPTION OF THE PREFERRED EMBODIMENT

Figure 1:
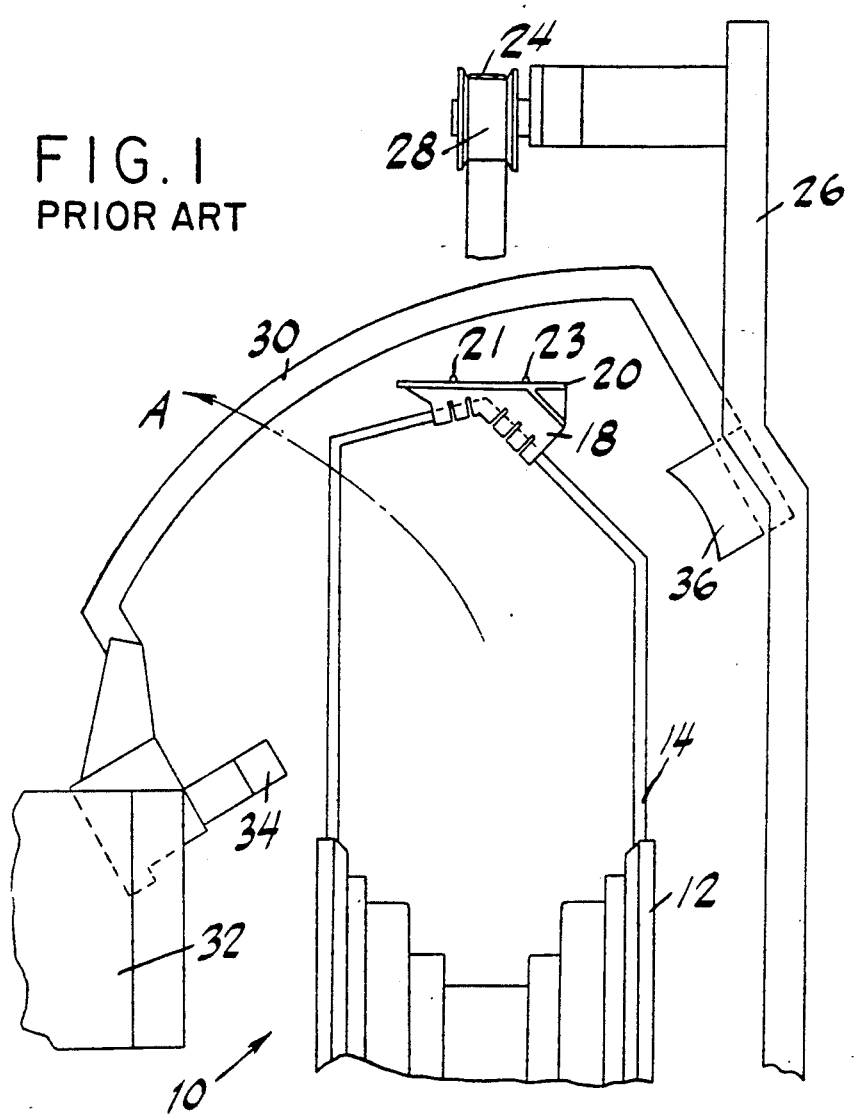
FIG. 1 is a fragmentary elevation of a record magazine and a portion of the record handling apparatus of the prior art.
Figure 2:
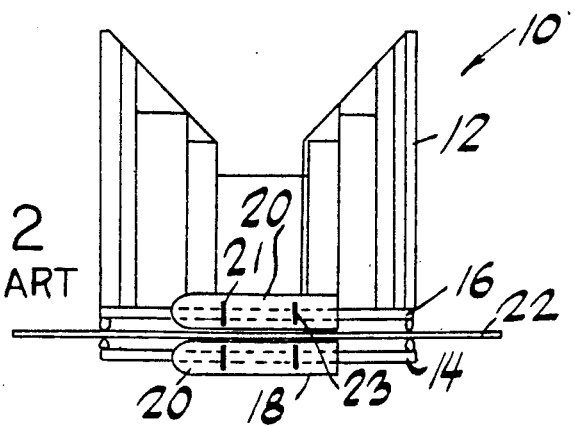
FIG. 2 is a fragmentary top plan of the apparatus shown in FIG. 1.
Figure 4:
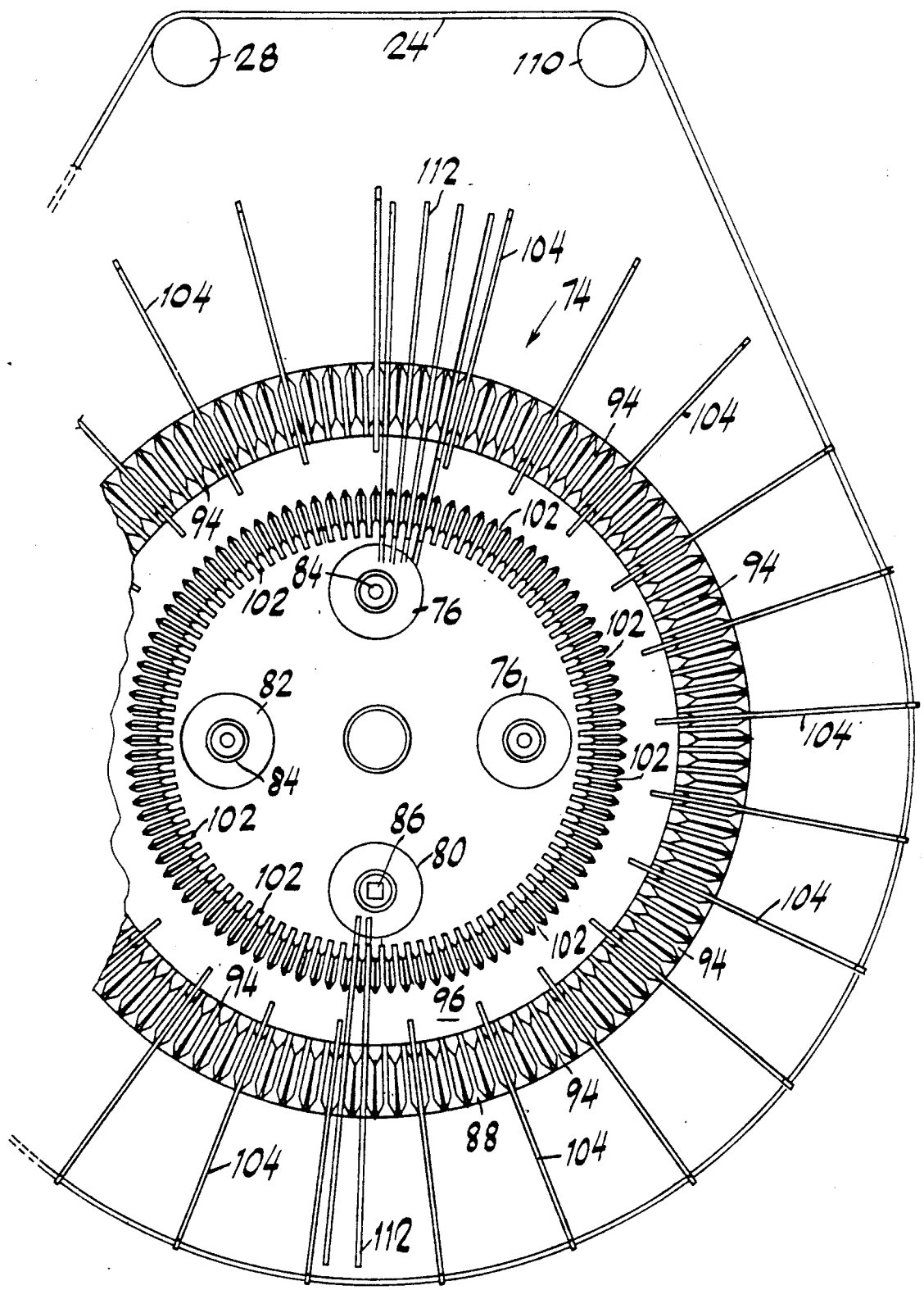
FIG. 4 is a front elevation of the rear half of my compact disc magazine with parts broken away.
Figure 5:
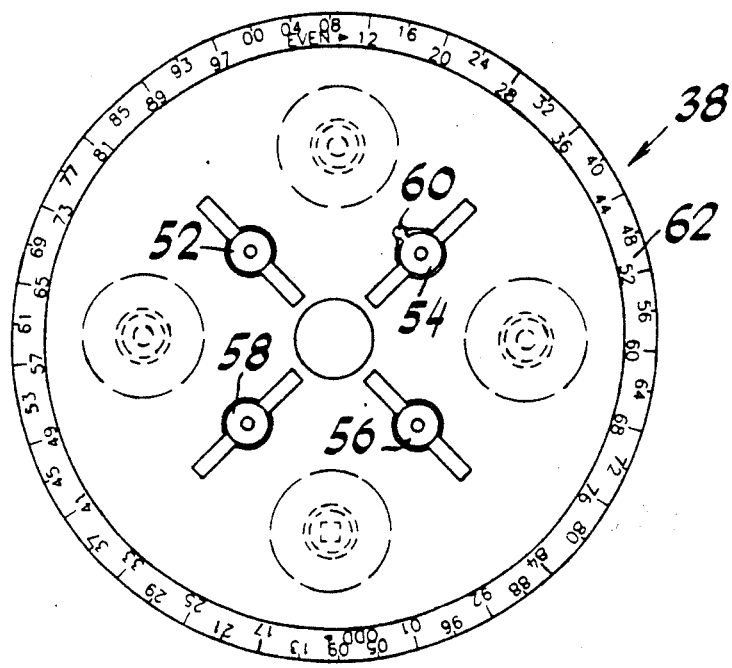
FIG. 5 is a front elevation of the front half of my compact disc magazine.
Figure 6:
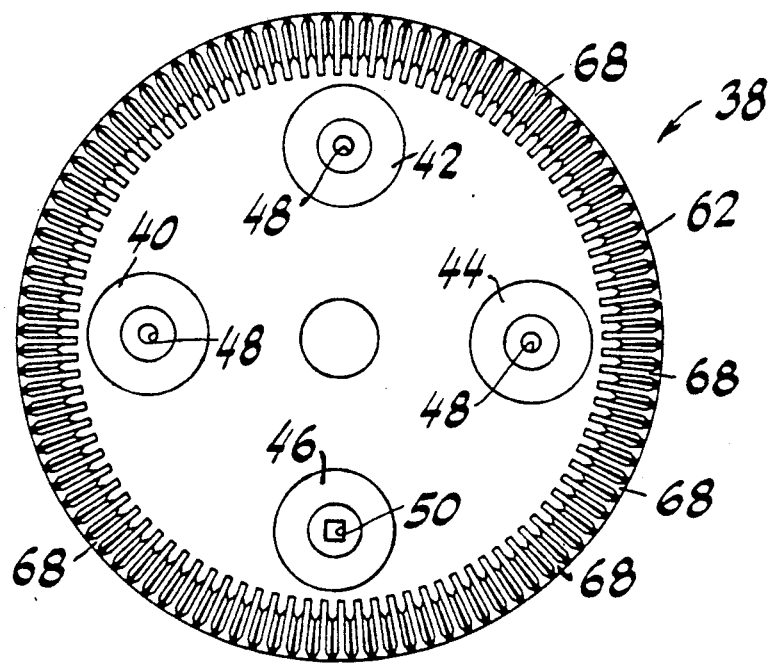
FIG. 6 is a rear elevation of the front half of my compact disc magazine.

Referring now to FIGS. 1 and 2, one form of record magazine indicated generally by the reference character 10 known in the prior art comprises a hub 12 on which there are assembled a plurality of wire forms of generally inverted U-shape, two of which 14 and 16 are shown. Each of the wire forms 14 and 16 at its outer end thereof carries a belt guide 18 which comprises a flange 20 formed with belt edge guides 21 and 23. Each pair of adjacent wire forms 14 and 16 receives therebetween a record 22, the edge of which rests on the hub 12. A belt 24 extends around the underside of the magazine between the edge guides 21 and 23 so as to retain all of the records in the magazine.

A roller support 26 extending to a position above the magazine 10 carries a pair of horizontally spaced rollers, one roller 28 of which is shown in FIG. 1, so as to space the belt 24 away from the magazine in the upper portion thereof.

A jukebox of the prior art having a magazine such as the magazine 10, includes a bow 30 and a manipulating mechanism 32. Bow 30 is provided with respective grippers 34 and 36 adapted to engage the periphery of a record to be played. As is known in the art, after the bow 30 has been moved from an inoperative position to a position at which the grippers 34 and 36 are in engagement with the edge of a disc 22 to be played, the bow is manipulated so as first to withdraw the record from the stack in the direction of the arrow A. When that has been done, the record is turned on its side and placed in position on the turntable (not shown).

Referring now to FIGS. 3, 5, 6 and 7, my improved magazine includes a molded front part indicated generally by the reference character 38 formed with a plurality of rearwardly extending bosses, 40, 42, 44 and 46. Each of the bosses 40, 42 and 44 has a central circular hole. Boss 46 is formed with a square hole 50.

I form the front member 38 with a plurality of front bosses 52, 54, 56 and 58 and with a locating pin 60. A gear 70 is adapted to be assembled on the bosses 52, 54, 56 and 58 by any suitable means such as by screws 72. Locating pin 60 rides into a hole 71 in the gear 70 properly to orient the gear on the magazine.

Member 38 includes an annular flange 62 which is formed with pairs of outwardly extending oppositely beveled teeth 64 and 66, each pair of which provides a slot 68 for receiving the edge of a compact disc in a manner to be described.

My compact disc magazine includes a rear member 74 formed with a plurality of forwardly extending bosses 76, 78, 80 and 82. Bosses 76, 78 and 80 have cylindrical pins 84 adapted to be received in the holes 48 when the front and rear members 38 and 74 are assembled. Boss 82 has a square pin 86 which fits into the square hole 50 in boss 46. It will be appreciated that when the front and rear members 38 and 74 are assembled with the pins 84 and 86 of bosses 76, 78, 80 and 82 and the holes 48 and 50 of bosses 40, 42, 44 and 46, the bosses 40, 42, 44 and 46 cooperate with bosses 76, 78, 80 and 82 to form a hub indicated generally by the reference character 89.

Member 84 has an outer flange portion 88 formed with a plurality of pairs of teeth 90 and 92 providing slots 94. An inner annular flange portion 96 is formed with a plurality of pairs of teeth 98 and 100 providing slots 102.

The rear member of my magazine carries a plurality of belt guide blades 104 of sheet metal or the like. Each blade 104 has a recess 106 adapted to receive the belt 24 when the blade is in the lower portion of the magazine.

Preferably I mold the two members 38 and 74 from a suitable synthetic resin, such for example as "Noryl", FM3020 which is the designation of GE Plastics for a polyphenylene oxide filled with glass or mica. Further, in forming the member 74 I mold the member 74 with the blades or guides 104 in place. In order to ensure that the blades are properly and firmly held in position, I provide each of the blades with a pair of holes through which material 108 and 110 flows in the course of the molding process. After the members 38 and 74 have been molded, pins 84 are inserted in holes 48 and pin 86 is inserted in hole 50 and the members cemented together.

It will be seen that I position a guide blade 104 adjacent to every fourth slot 94 around the periphery of the member 74. In so doing, I position the blade between the tooth 92 making up one wall of the fourth slot and the tooth 90 forming the wall of the first slot 94 of the next series.

The beveled edges of each of the pairs of teeth 64 and 66, 90 and 92, and 98 and 100 facilitate the entry of the edge of a disc 112 into the slots 68, 94 and 102 when the magazine is loaded. It will further be seen that the disc is contacted only in the non-playing area 114 at the periphery of the disc.

It will readily be appreciated that, as in the prior art, my magazine 10 is supported for rotation around a generally horizontal axis X—X as shown in FIG. 3. The surfaces in which the slots 68 and 94 are formed are inclined at an acute angle of about 45 degrees to the axis X—X. The surface in which the slots 102 are formed is generally perpendicular to the axis X—X.

In operation of my magazine, the bow 30 is operated by the mechanism 32 so that the grippers 34 and 36 grasp the edge of a disc 112 and withdraw from the magazine in the direction of the arrow A in FIG. 3. It will be seen that the upper area of the magazine is entirely free of any elements which might be engaged by the disc 112 as it is being withdrawn. Moreover, no portion of the disc is required to slide past any part of its supporting mechanism as it is withdrawn. This is owing to the fact that all slot forming portions of the magazine are located behind a diameter of the disc passing through the points at which it is engaged by the grippers 34 and 36 with reference to the direction of the arrow A. Thus, the danger of any damage to the disc as it is being withdrawn is minimized.

It will be seen that I have accomplished the objects of my invention. I have provided a compact disc magazine which overcomes the defects of magazines of the prior art. My magazine is especially adapted to handle compact discs. It is constructed in such a way as to minimize the possibility of damage to the disc as it is being withdrawn from the magazine. My magazine more closely controls the position of the disc than do magazines of the prior art. It is less expensive to produce than are magazines of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. In a jukebox of the type having a magazine mounted for rotation around a generally horizontal axis so as to present a top and an upper front portion thereof and an automatic mechanism for engaging a compact disc in a position adjacent to the top of the magazine at generally diametrically opposite points on the disc and removing the disc from the magazine through the upper front portion thereof, an improved magazine for storing a plurality of compact discs including in combination a hub, said hub having a front and a back, disc-receiving means at spaced locations around said hub, said hub being mounted for movement around a generally horizontal axis so that discs carried by said disc-receiving means are individually moved to said position, said hub being devoid of disc-receiving means at said locations over a region above and in front of a line passing through said points so that said disc-receiving means at said locations are limited to a segment of a disc at said position below and to the rear of a line passing through said points, a plurality of belt guides carried by said hub, a belt and means for directing said belt into engagement with said guides over the lower portion of said magazine and away from said guides over the upper portion of said magazine.

2. A magazine as in claim 1 in which each of said discs has a non-playing area adjacent to its periphery, said disc-receiving means being further limited to said non-playing area.

3. A magazine as in claim 2 in which said disc-receiving means comprises grooves for receiving said non-playing areas of said discs.

4. A magazine as in claim 3 including means for retaining discs in said grooves in the lower portion of said magazine.

5. A magazine as in claim 4 in which said retaining means is a belt.

6. In a jukebox of the type having a magazine mounted for rotation around a generally horizontal axis so as to present a top and an upper front portion thereof and an automatic mechanism for engaging a compact disc in a position adjacent to the top of the magazine at generally diametrically opposite points on the disc and removing the disc from the magazine through the upper front portion thereof, an improved magazine for storing a plurality of compact discs including in combination a hub, said hub having a front and a back, disc-receiving means at spaced locations around said hub, said hub being mounted for movement around a generally horizontal axis so that discs carried by said disc-receiving means are individually moved to said position, said hub being devoid of disc-receiving means at said locations over a region above and in front of a line passing through said points so that said disc-receiving means at said locations are limited to a segment of a disc at said position below and to the rear of a line passing through said points, said disc-receiving means comprising a first flange on one side of said hub providing an inwardly facing first annular surface at an acute angle to said axis, a plurality of circumferentially spaced first grooves in said first surface, a second flange on the other side of said hub providing a second annular surface facing inwardly at an acute angle to said axis and a third annular surface facing inwardly at a location beyond said second surface, a plurality of circumferentially spaced second grooves in said second surface and a plurality of circumferentially spaced third grooves in said third surface, corresponding first and second and third grooves being on the locus of a circle having a diameter approximately that of a compact disc supported thereby.

7. A magazine as in claim 6 in which each of said first and second surfaces makes an angle of approximately 45° with said axis.

8. A magazine as in claim 7 in which said third surface is generally perpendicular to said axis.

9. A magazine as in claim 6 in which each of said first and second grooves is in the half of said circle adjacent to said axis.

10. A magazine as in claim 9 in which said third groove is at a diameter of said circle parallel to said axis.

11. A magazine as in claim 6 including a plurality of retainer belt guides.

12. A magazine as in claim 11 in which said retainer guides extend from said third surface to a location adjacent to the end of a diameter of said circle which is perpendicular to said axis.

13. A magazine as in claim 12 in which said guides are blades.

14. A magazine as in claim 13 in which adjacent blades are separated by respective pluralities of said third grooves.

15. A magazine as in claim 6 in which a first half of said hub and said first flange comprise a first integrally molded piece, and a second half of said hub and said second flange comprise a second integrally molded piece, said first piece being formed with a plurality of bosses carrying pins, said second piece being formed with a plurality of bosses having holes for receiving said pins.

16. A magazine as in claim 15 in which one of said pins and one of said holes are cylindrical and another of said pins and said holes are of non-circular cross-section.

17. A magazine for holding a plurality of compact discs including in combination a generally circular hub having an axis of rotation, a first flange on one side of said hub providing an inwardly facing first annular surface at an acute angle to said axis, a plurality of circumferentially spaced first grooves in said first surface, a second flange on the other side of said hub providing a second annular surface facing inwardly at an acute angle to said axis and a third annular surface facing inwardly at a location beyond said second surface, a plurality of circumferentially spaced second grooves in said second surface and a plurality of circumferentially spaced third grooves in said third surface, corresponding first and second and third grooves being on the locus of a circle having a diameter approximately that of a compact disc supported thereby and being so located as to permit ready removal of the disc.

18. A magazine as in claim 17 in which each of said first and second surfaces makes an angle of approximately 45° with said axis.

19. A magazine as in claim 18 in which said third surface is generally perpendicular to said axis.

20. A magazine as in claim 19 in which each of said first and second grooves is in the half of said circle adjacent to said axis.

* * * * *